Oct. 20, 1942.　　　E. ERICSSON　　　2,299,216
PISTON SEALING DEVICE
Filed July 31, 1939
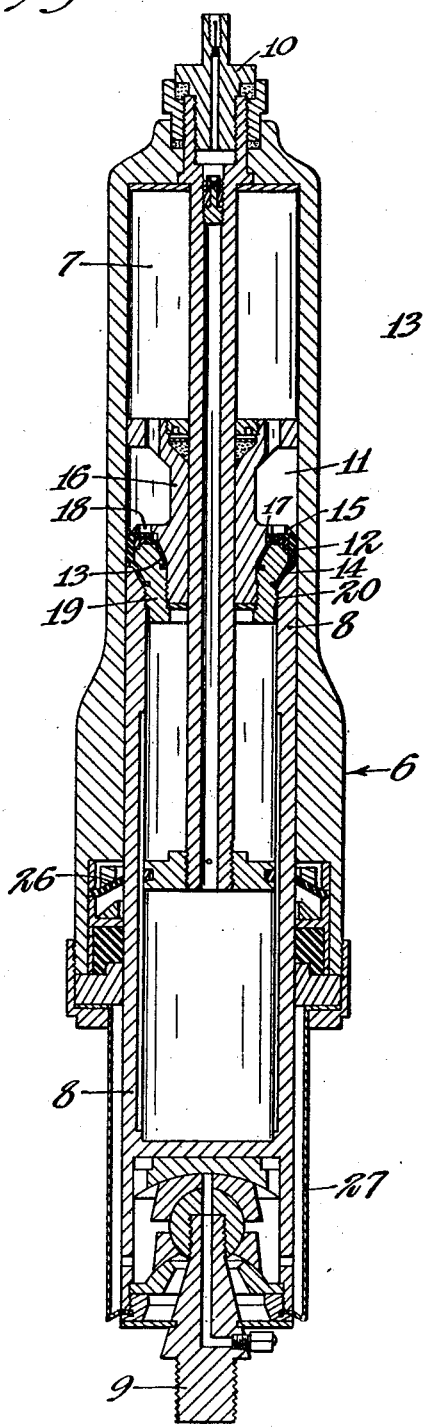

Patented Oct. 20, 1942

2,299,216

UNITED STATES PATENT OFFICE 2,299,216

PISTON SEALING DEVICE

Elov Ericsson, St. Paul, Minn.

Application July 31, 1939, Serial No. 287,563

15 Claims. (Cl. 309—31)

This invention relates to a device particularly although not exclusively adapted for sealing the pistons of pneumatic springs, shock absorbers and the like.

It is my object to provide a novel sealing device of this class which is rendered unusually durable by providing a large bearing surface and means whereby the pressure per unit of area of the bearing surface is positively retained at such values as to insure an efficient seal while preventing excessive wear so that the device is adapted for use where fluids under high pressure are to be confined by the piston.

A particular object is to provide an expansible sealing member embracing a piston and so formed that the total sealing force is always proportional to the pressure within the cylinder but is distributed over an unusually large area and maintained within safe limits by a novel arrangement of pressure distributing means and means insuring the proper expansion and contraction of the contact surface of the sealing member.

Another object is to provide a flexible and elastic sealing member embracing a piston and having a long skirt or peripheral bearing member which is confined at its ends but caused to expand and contract under the influence of fluid pressures in chambers formed in the piston.

Other objects will appear and be more fully pointed out in the following specification and claims.

Referring to the accompanying drawing which illustrates the best form of my device at present known to me:

Figure 1 is a vertical section of a pneumatic cylinder or spring having my improved sealing device;

Fig. 2 is a vertical section on a larger scale showing details of my improved sealing means together with fragmentary portions of the cylinder and piston;

Fig. 3 is a plan view of one of the expansible metal rings for supporting the elastic sealing member, and Fig. 4 is a side view of the metal ring shown in Fig. 3.

In Fig. 1 my device is illustrated in connection with a pneumatic spring having a cylinder indicated generally by the numeral 6, of the type described and claimed in my Patents No. 1,754,989, dated April 15, 1930, and No. 2,064,527, dated December 15, 1936. The spring has a cylindrical pressure chamber 7 and an elongated piston 8 which is movable vertically in the chamber 7 and connected at its lower end to a piston operating member 9. Air or gas under pressure is admitted to the chamber 7 through a valve 10 and the piston is lubricated and the seal improved by maintaining a supply of oil in a chamber 11 formed in the upper part of the piston.

To efficiently seal the connection between the piston 8 and the relatively movable cylinder walls, I provide an elastic and flexible sealing member having an outer bearing or skirt portion 12 embracing the piston and formed integral with inwardly and obliquely downwardly projecting, annular flanges 13 and 14. The upper extremity of the skirt portion 12 abuts against an annular flange 15 formed on a piston head 16. Between the flange 15 on the piston head and flange 13 on the sealing member is a small annular chamber 17 which communicates with the high pressure chamber 7 through a plurality of perforations 18 formed in the flange 15. The inner and lower peripheries of the flanges 13 and 14 are confined and firmly held by a nut 19 threaded on the head 16 and secured to the walls of the piston as by threads 20, a beveled upper end on the piston wall being formed to engage the outer surface of the flange 14.

The nut 19 has a horizontal top surface and an annular shoulder in its outer periphery for confining an expansible ring 21. This ring 21 is split, as indicated at 21a in Figs. 3 and 4, and has a cylindrical outer surface of substantial area engaging the inner periphery of the skirt portion 12 of the sealing member. Another expansible metal ring 22 abuts against the inner periphery of the ring 21 and is supported on the horizontal, top surface of the nut 19 to afford a support for the bottom or low pressure side of the flange 13 of the sealing member. A third expansible metal ring 23 is placed in the high pressure chamber 17 in overlapping relation to the rings 21 and 22 to transmit radially directed pressure to the skirt portion 12. The rings 22 and 23, like the ring 21 are split to allow them to expand. By this arrangement of metal rings the part of the flexible sealing member which is exposed to high pressure on top is continuously supported on metal surfaces below and at the same time is allowed to stretch radially outward against the cylinder walls to compensate for wear.

A low pressure chamber 24 is formed within the annular confines of the flanges 13 and 14 containing the rings 21 and 22. This chamber is preferably placed in communication with the low pressure end of the cylinder through one or more small perforations 25 formed in the lower extremity of the skirt portion 12 of the flexible sealing member. The sealing member is preferably constructed from soft rubber and it will be evident that the outer cylindrical surface of the skirt portion 12 bears against a substantial area of the cylindrical walls. The relatively small, high pressure chamber 17 exerts its pressure radially and the pressure so directed is applied only to the upper part of the ring 21.

Fluid under high pressure is admitted to the annular chamber 17 through the perforations 18 in the flange 15 and this pressure is transmitted to the expansible ring 21 through the ring 23, elastic flange 13, and ring 22. Thus the high pressure is distributed over a relatively large area of the skirt portion 12 and the pressure per unit of area of contact surface is much lower than the pressure per unit of area in the chamber 7. The lower pressure chamber 24 allows the skirt portion 12 to expand and contract while conforming with adequate pressure to the cylinder wall. Excessive binding force and wear is further guarded against by my arrangement of the flanges 13 and 14 which confine the upper and lower peripheries of the skirt portion 12 and maintain the same under control at all times.

It will be understood that the outer or low pressure end of the piston is normally subjected to atmospheric pressure only and that, when the piston is stationary relative to the cylinder, air at atmospheric pressure is admitted along the cylinder walls immediately below the skirt portion 12 and up to the point where one or more of the small perforations 25 extend through the elastic sealing member to communicate with the chamber 24 and prevent the building up of high pressure in the latter. This low pressure chamber, as hereinbefore pointed out, contains the expansible rings 21 and 22 which press the skirt portion 12 outward against the cylinder wall by pressure exerted in the chamber 17 but distributed in the low pressure chamber. By this arrangement, I prevent the building-up of high pressure, substantially equal to that in the chamber 17, in the annular space containing the rings 21 and 22. In the absence of the perforation 25, it is possible that oil from the high pressure chambers 11 and 17 might be forced past the flange 13 into the annular chamber containing the rings 21 and 22 where such oil might build up pressure in this chamber equal to that above the piston. If this occurred, the pressure per unit area of the skirt portion directed against the cylinder wall would be equal to that in the high pressure chamber and this would create the excessive binding force and rapid wear which my device is designed to avoid. It will thus be understood that the perforation 25 guards against such building up of pressure behind the skirt portion 12. However, if the flanges 13 and 14 are gripped by the nut 19 with sufficiently high pressure to form a tight seal between the upper end of the piston 8 and beveled surface on the piston head 16 there can be no building up of high pressure behind the skirt 12, even in the absence of the perforation 25. For this reason the perforation 25 is not essential.

The film of oil between the walls of the piston 8 and cylinder is prevented from escaping from the lower end of the cylinder by a suitable seal, indicated generally by the numeral 26, such as that described and claimed in my Patent No. 2,064,527. In the embodiment illustrated, the piston 8 projects from the lower end of the cylinder 6 and to protect the film of oil on the projecting portion of the piston from grit and other foreign substances a flexible cover 27 is secured to the lower ends respectively of the cylinder and piston.

Having described my invention, what I claim as new and desire to protect by Letters Patent is:

1. In combination with a piston, sealing means comprising, an annular elastic member having a skirt embracing the outer periphery of the piston and extending longitudinally thereof, integral, annular flanges extending inwardly from said skirt, means securing said flanges on the piston and an annular chamber formed in the piston and member between said flanges and communicating with the low pressure end of the piston.

2. In combination with a piston, sealing means comprising, an annular elastic member having a skirt embracing the outer periphery of the piston and extending longitudinally thereof, means securing the opposite ends respectively of said skirt to the piston and an annular chamber formed in the piston and member adjacent to the inner surface of said skirt, said skirt being formed with an opening communicating with said chamber.

3. In combination with a piston, sealing means comprising, an annular, elastic member having a skirt embracing the outer periphery of the piston and extending longitudinally thereof, integral annular flanges extending inwardly from said skirt, said flanges being located near opposite ends of said skirt respectively, means securing said flanges on the piston, an annular chamber formed in the piston and member between said flanges and a passage connecting said chamber to the outer periphery of the skirt.

4. In combination with a pressure cylinder having a reciprocating piston, a sealing device comprising, an annular sealing member secured to the periphery of said piston and extending a substantial distance longitudinally thereof, an annular, expansible ring fitting within said member for distributing expansion forces to the interior surface of said member and interior chambers formed in said piston and member, one communicating with the high pressure end of the cylinder, the pressures in both of said chambers affecting the sealing pressures exerted by said member and the area of said member exposed to the pressure of said low pressure chamber being greater than the area of said member exposed to radial pressure in said high pressure chamber.

5. In combination with a pressure cylinder having a reciprocating piston, a sealing device comprising, an annular sealing member embracing the periphery of said piston and extending a substantial distance longitudinally thereof, annular, inwardly extending flanges formed on said member near opposite ends thereof, means securing said flanges to said piston and interior chambers formed in said piston and member, one communicating with the high pressure end of the cylinder, the pressures in both of said chambers affecting the sealing pressures exerted by said member and the area of said member exposed to the pressure of said low pressure chamber being greater than the area of said member exposed to radial pressure in said high pressure chamber.

6. In combination with a pressure cylinder having a reciprocating piston, a sealing device comprising, an annular, sealing member constructed from elastic rubber, embracing the periphery of said piston and extending a substantial distance longitudinally thereof, annular, inwardly extending flanges formed on said member near opposite ends thereof, means securing said flanges to the piston, an annular expansion ring fitting within said member for distributing expansion forces to the interior surfaces of said member and interior chambers formed in said piston and member, one communicating with the high pressure end of the cylinder, the pressures in both of said chambers affecting the sealing pressures exerted by said member and the area of said member exposed to the pressure of said low pressure chamber being greater than the area of the same exposed to radial pressure in said high pressure chamber.

7. In combination with a piston, sealing means comprising, an annular flexible and elastic member embracing the piston and having a skirt extending longitudinally thereof, said piston and member being formed with an interior high pressure chamber, an expansion ring engaging the inner surface of said skirt to transmit outward pressure thereto, an elastic annular flange on said skirt extending inward therefrom and separating said ring from said chamber, means securing said flange to the piston and a second expansible ring engaging the inner periphery of said first mentioned ring and supporting the low pressure side of said flange.

8. In combination with a piston, sealing means comprising, an annular flexible and elastic member embracing the piston and having a skirt extending longitudinally thereof, said piston and member being formed with an interior high pressure chamber and an annular shoulder, an expansion ring confined on said shoulder and engaging the inner surface of said skirt to transmit outward pressure thereto, an elastic annular flange on said skirt extending inward therefrom and separating said ring from said chamber, means securing said flange to the piston and continuous means supporting the low pressure side of said flange.

9. In combination with a piston, sealing means comprising, an annular flexible and elastic member embracing the piston and having a skirt extending longitudinally thereof, said piston and member being formed with an interior high pressure chamber, an elastic annular flange on said skirt extending inward therefrom and formed with a cylindrical portion concentric with said skirt and interposed between said chamber and skirt, means securing the inner periphery of said flange to the piston and expansion rings engaging the inner and outer peripheries respectively of said cylindrical portion of the flange to guide the same radially under the pressure exerted in said chamber.

10. In combination with a piston, sealing means comprising, an annular flexible and elastic member embracing the piston and having a skirt extending longitudinally thereof, said piston and member being formed with an interior high pressure chamber, an expansion ring engaging the inner surface of said skirt to transmit outward pressure thereto, an elastic annular flange on said skirt extending inward therefrom and formed with a cylindrical portion concentric with said skirt and separating said ring from said chamber, means securing the inner periphery of said flange to this piston and expansion rings engaging the inner and outer peripheries respectively of said cylindrical portion of the flange to guide the same radially under the pressure exerted in said chamber.

11. In combination with a piston, an annular expansible member having a skirt embracing the piston and extending longitudinally thereof, said piston and member forming between themselves a plurality of chambers, one of said chambers being in communication with a portion of the expansible member and also with the high pressure end of the piston thereby forming a high pressure chamber and another of said chambers being sealed from the high pressure end of the piston by the expansible member and thereby forming a low pressure chamber, the pressures of said chambers tending to control the expansion of said skirt and the area of said member directly subject to radial pressure in said high pressure chamber being substantially smaller than the area thereof subject to radial pressure in said low pressure chamber.

12. The combination described in claim 11 in which resilient means are provided for distributing the force exerted in said high pressure chamber to a substantial interior area of said skirt.

13. The combination described in claim 11 in which an expansible ring is disposed in said low pressure chamber to distribute the force exerted in said high pressure chamber to a substantial interior area of said skirt.

14. The combination described in claim 11 in which a split ring for distributing expansion forces to a substantial interior area of said skirt is provided and the pressure in said high pressure chamber exerts its expansion force through said ring to said skirt.

15. The combination described in claim 11 wherein an elastic portion of said member is arranged to separate said chambers and an expansible ring is disposed in said low pressure chamber to distribute the force exerted in said high pressure chamber to a substantial interior area of said skirt.

ELOV ERICSSON.